United States Patent [19]
Reding

[11] 3,742,664
[45] July 3, 1973

[54] OVERHEAD STORAGE BIN
[76] Inventor: Gerald J. Reding, Box 1235, Levelland, Tex. 79336
[22] Filed: Mar. 30, 1972
[21] Appl. No.: 239,695

[52] U.S. Cl............ 52/194, 52/197, 222/185
[51] Int. Cl............ E04h 7/22, B67d 5/06
[58] Field of Search............ 52/192, 194, 196, 52/197, 245, 248; 222/185

[56] References Cited
UNITED STATES PATENTS
3,248,024  4/1966  Keathly............ 52/194 X
3,602,400  8/1971  Cooke............ 222/185
3,658,211  4/1972  Kitchens............ 52/194 X Primary Examiner—Price C. Faw, Jr.
Attorney—Marcus L. Bates

[57] ABSTRACT

A cylindrical overhead storage bin made of fiberglass which includes a lower conical section that is supported by a saddle arranged at the upper extremity of a superstructure. The saddle distributes the load of the storage bin into the superstructure in a manner that enables the wall thickness of the bin to be held to a minimum value.

5 Claims, 10 Drawing Figures

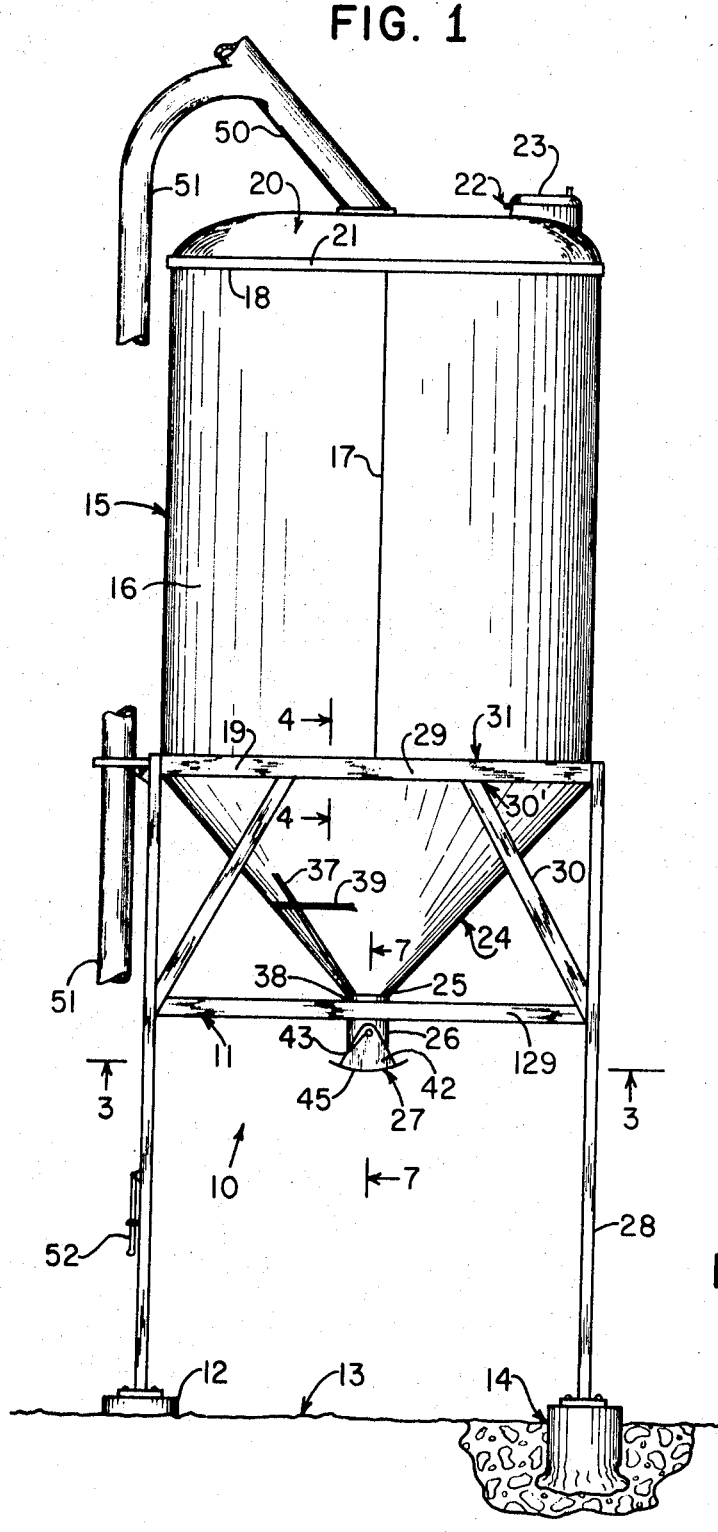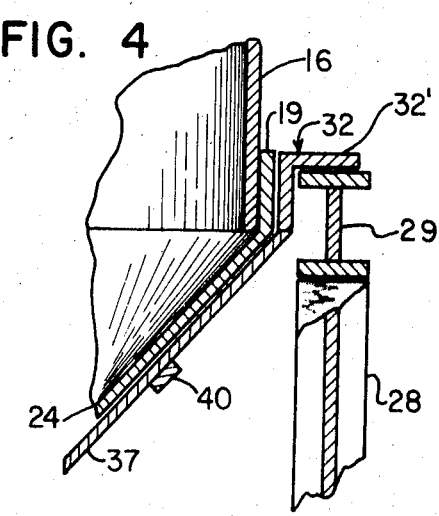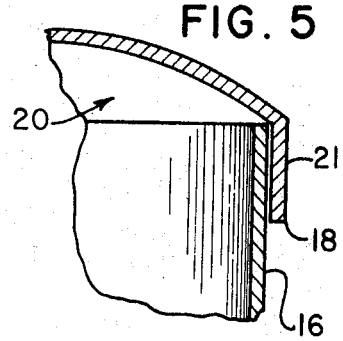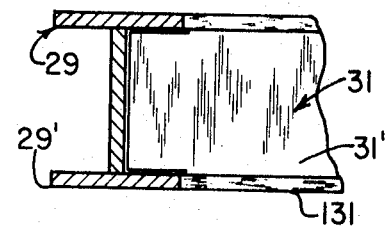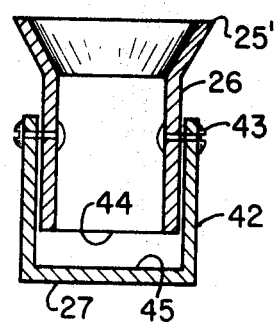

3,742,664

OVERHEAD STORAGE BIN

BACKGROUND OF THE INVENTION

Overhead storage bins are used for storage of bulk material such as fertilizer and grains as well as other material which must be stored and subsequently transported in tonage lots. The storage bin is generally fabricated in a manufacturing facility and delivered in dismantled configuration to its erection site. Transportation of the storage bin from its place of fabrication to its point of installation accordingly limits the physical size of the structure because of local, state and federal laws and ordinances which dictate the weight, width, height, and length of apparatus which can be transported overland.

Storage bins of the prior art have heretofore been made of steel. In handling fertilizers and other corrosive materials, the metallic surfaces of the apparatus undergo chemical reaction with the fertilizer which rapidly deteriorates the structure and presents an expensive problem. This is especially so of the outer peripheral wall surface of the structure because of the accumulation of atmospheric moisture which becomes admixed with fertilizer dust accumulated on the exterior surface, thereby providing a mixture having a P.H. which attacks unprotected metallic surfaces.

In order to combat corrosion the structure of a storage bin is often painted with an acid resistant paint, such as an epoxy paint or the like. Where the humidity is sufficiently high to cause occasional accumulation of dew on the metallic surfaces, or where the rainfall is appreciable, it is sometime necessary to sandblast and repaint the structure each 3 years in order to effectively control the corrosion problem. This continual maintenance cost represents a considerable expenditure of labor and money.

Accordingly, it would be advantageous to have provided an overhead storage bin which can be shipped by common transportation to its point of intended use, and rapidly assembled and placed into operation by utilizing ordinarily available labor and equipment. It is further desirable to provide an overhead storage bin which is resistant to corrosion, especially where there is an appreciable amount of atmospheric moisture.

Moreover, it would be advantageous to have provided an overhead storage bin which is resistant to abrasion so as to enable the storage of food stuffs, plastics, as well as other materials which must be handled in a manner to prevent contamination thereof.

SUMMARY OF THE INVENTION

This invention comprehends an overhead storage bin having a cylindrical body, a dome shaped closure member at the top or upper extremity of the body, and a lower portion made in the form of an inverted cone. An upper marginal edge portion of the base of the cone is joined to a lower marginal edge portion of the cylinder by a skirt member. The skirt member is slidably received within a support band, with the band having an outwardly directed circumferentially extending flange which provides means by which the entire storage bin is supported from a superstructure.

A plurality of radially spaced apart tension members are connected to the band and lay adjacent to the cone so as to form a saddle which bottom supports the bin. The superstructure includes a framework especially designed to transfer the load from the flange of the band into pairs of upstanding legs. The entire apparatus can be prefabricated at one location and transported to its final destination where it can be assembled in a minimum of time.

Accordingly, a primary object of the present invention is the provision of an overhead storage bin which requires a minimum of maintenance during its lifetime.

Another object of the invention is to provide an overhead storage bin which can be prefabricated and shipped in a disassembled form.

A further object of this invention is to disclose and provide an overhead storage bin having an improved suspension mechanism.

A still further object of this invention is to provide a cylindrical storage bin supported by a plurality of legs in a new and unusual manner.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a partially broken, elevational view of an overhead storage bin made in accordance with the present invention;

FIG. 4 is a cross-sectional view taken along line 4—4 of FIG. 1;

FIG. 5 is a cross-sectional view taken along line 5—5 of FIG. 2;

FIG. 6 is a part cross-sectional view which sets forth a detail of the present invention;

FIG. 7 is a cross-sectional view of a part of the apparatus disclosed in FIG. 1;

DETAILED DESCRIPTION OF THE DRAWINGS

Figure 2:
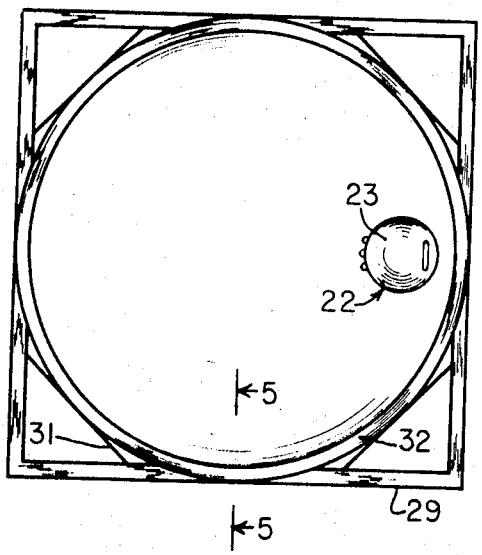
FIG. 2 is a top plan view of the storage bin disclosed in FIG. 1.

Throughout the various figures, wherever possible, like or similar numerals refer to like or similar elements.

In FIG. 1 an overhead storage bin is generally indicated by the numeral 10. A trussed framework 11, also called a superstructure, is bolted to foundation 12 with the foundation being placed predominantly below ground level 13 in the manner generally indicated by the numeral 14.

A cylindrical upstanding storage bin 15 includes a main body portion 16 made up of two joined together halves of a cylinder which forms diametrically opposed interfaces, one of which is seen indicated by numeral 17. Upper and lower opposed edge portions 18 and 19 of the illustrated skirt members generally define the height of the cylinder with upper edge portion 18 joining the cylinder to a domed type closure means 20. Upwardly opening man-hole 22 has a closure means 23 removably affixed thereon so as to enable access to the interior of the bin.

An inverted frusto cone 24, hereinafter called "a cone" forms the lower portion of the storage bin with the minor diameter of the cone terminating at an interface 25 where it is flow connected to the inlet portion of the body 26 of a valve. The valve includes an arcuate pivotally movable member 27 which regulates the flow of the contents of the bin therethrough.

Spaced apart vertical support legs 28 bear against the before mentioned foundation and upwardly extend into engagement with an upper rail 29. Four rails 29 have the depending ends thereof joined together in the illustrated manner of FIGS. 1–3 and 10 so as to provide a framework which is square in horizontal cross-sectional configuration. Spaced apart from and underlying the rail 29 is a second set of four members 129 having the depending ends thereof effectively joined together and to each of the four support legs. Eight diagonal members, one of which is seen at 30, are each affixed to the depending ends of member 129, to an intermediate portion of the leg 28, and to an intermediate portion of the rail 29, all in the illustrated manner of FIGS. 1 and 3.

Figure 3:
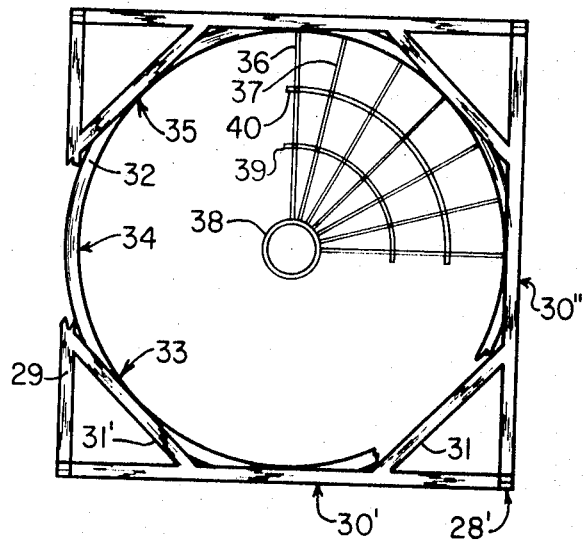
FIG. 3 is a cross-sectional view taken along line 3—3 of FIG. 1.

As particularly illustrated in FIGS. 1 and 3, horizontal diagonal member 31 is attached to an intermediate portion of adjacent members of rail 29 at a location which coincides with the intersection of diagonal 30. Accordingly, any load placed on member 31 is transferred into the rail and into the diagonal 30 with the resultant force accumulating in leg 28 at the depending ends of members 129.

As seen in FIGS. 2–4, band 32 includes a vertical circumferentially extending portion which engages the before mentioned skirt member 19, and further includes a horizontally outwardly disposed flange portion 32' which ultimately enables the entire weight of the bin to be transferred into the upstanding legs. As seen in FIGS. 2 and 3, the flange 32 is supported at eight different contact or bearing points, such as seen at 33, 34, and 35, for example.

Radially spaced apart tension members 36, 37 have one depending end thereof attached to the lower edge portion of the band 32, with the remaining end portion being attached to a small band 38 located adjacent to the apex of the cone. Bands 39 and 40 have marginal portions thereof attached to the tension members so as to add rigidity to the structure and also to maintain the members properly aligned relative to the remainder of the structure. The bands and tension members form a saddle for bottom supporting the cone.

The before mentioned apex of the cone is attached to sloped wall 25' of valve 26. The valve includes spaced apart side walls 42 each of which are journaled at 43 to the body of the valve, with an arcuate gate 45 underlying edge portion 44 of the valve body. Where deemed desirable, band 38 can be directly attached to the uppermost edge portion of the bugle 25' with the apex of the cone being freely or slidably received within and enclosed by the bugle. The weight of the cone effectively seals the overlapping circumferentially extending coacting marginal end portions of the cone and bugle, and provides for a slip joint.

Looking again now to FIG. 1, there is seen an inclined conduit 50 which has one end thereof connected to the dome so as to enable an elevator (not shown) to load the bin. Conduit 51 extends downwardly into proximity of the ground so as to enable the bin to be filled by means of an air-lift.

Figure 9:
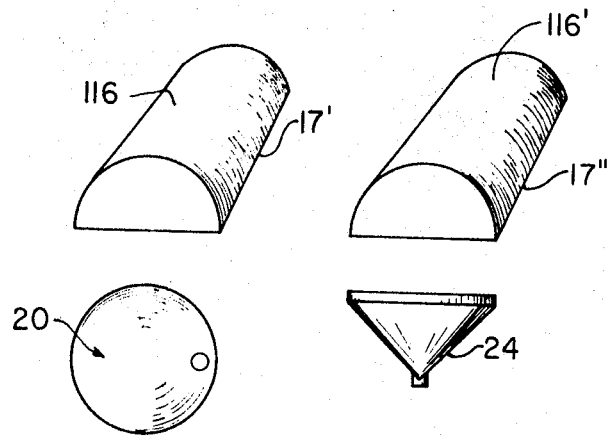
FIGS. 9 and 10 are schematical representations of an important aspect of the present invention.
Figure 8:
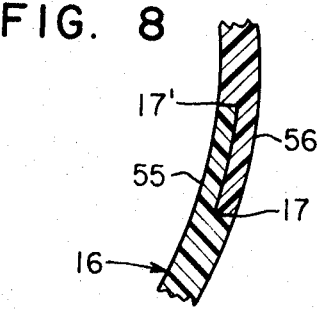
FIG. 8 is an enlarged cross-sectional view showing a detail of the present invention.

As seen in FIGS. 8 and 9, the before mentioned seam 17 of FIG. 1 is formed by joining together two semicircular elongated cylinders with the edge portions 17, 17' defining the overlapping portions 55, 56 of the cylinder halves. The apparatus can be shipped to its erection site by stacking the halves 116, 116' and standing the dome and the cone on its side to thereby present a load of minimum width and height which can be transported along a highway.

Figure 10:
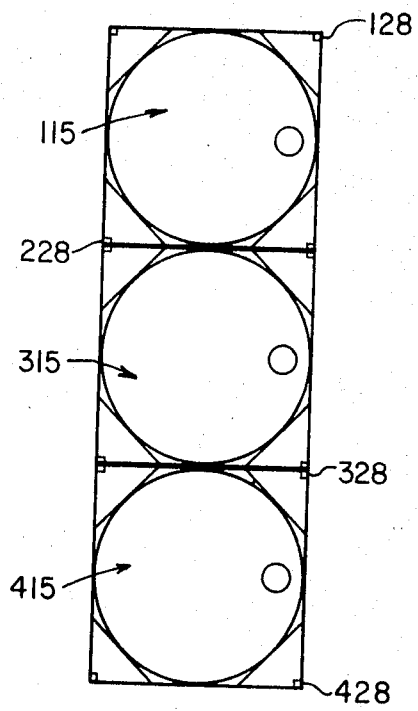

As seen in FIG. 10, where a plurality of tanks are to be assembled, the tanks may be placed adjacent to one another in the illustrated manner indicated by numerals 115, 315, so that a second or third tank requires only two additional legs each, thereby effecting a considerable savings in the superstructure cost of the overhead storage bin assembly. In other words, by fabricating two or more storage bins, pairs of adjacent legs can be mutually shared by adjacent storage bins.

OPERATION

In erecting the apparatus of the present invention, it is preferable to lay the foundations 14 and thereafter fabricate the superstructure, including placement of the band 32 along with the radially spaced apart tension members 37 which form the saddle. The valve is next welded or otherwise affixed to member 38, and the cone 24 placed into position with vertical circumferentially extending marginal edge portion 19 bearing against the band. It is preferred that skirt member 19 be disposed outwardly of cylinder 16 with an excess of epoxy being used in joining together the marginal end portion of the cylinder with the cone so as to fill the corner illustrated at 19. The dome 20 is assembled to the cylinder by using epoxy resin, with the skirt 21 preferably being circumferentially disposed outwardly of the cylinder. Conduits 50, 51 are next placed into position with the weight thereof being transferred into the superstructure or into the elevator by suitable brackets (not shown).

The storage bin is filled by utilizing a blower at 51 or the before mentioned elevator at 50. When it is desired to transfer material from the storage bin into a dump truck or the like, handle 52 is pivotally moved, thereby rotatably opening gate valve 45 whereupon the contents of the bin are free to flow through the valve 26.

It is unnecessary for surface 45 and 44 of the valve to be a close tolerance fit for the reason that granular material such as fertilizer and the like, will not flow through the closed valve so long as the surfaces are within about one-fourth inch of one another.

The superstructure which supports the storage bin preferably is built of H-beams so as to enable the abutting pieces thereof to be rapidly cut and affixed to one another in the illustrated manner of FIG. 6, for example.

The storage bin, which includes the cylinder 16, the dome shaped closure member 20, and the inverted cone 24, preferably is made of laminated fiberglass while the valve 26 is made of stainless steel. The fiberglass is laid up of a plurality of sheets of glass fabric, bonded together by a suitable resin in the usual manner. The thickness of the cylinder wall should be at least one-fourth inch for a 12 foot diameter cylinder.

The dome closure member 20 adds rigidity to the upper portion of the cylinder and forms a monocoque structure when the skirt member 21 is cemented into place at the upper marginal end portion of the cylinder. The skirt member 19, when cemented or otherwise affixed by resin to the lower depending end of the cylinder, likewise adds rigidity to the lower portion of the assembly. The circumferentially extending band 32 provides reinforcement to prevent deformation of the lower extremity of the cylinder. Tension members 36, 37 preferably are placed on 18 inch centers about the entire circumference of the structure, as measured circumferentially about the band at 32. Since the tension members are effectively affixed to the bugle 25' of the valve because of the presence of member 38, the cone is amply supported although it is fabricated from fiberglass and resin having a thickness of only one-fourth inch.

While it is preferred that the apex of the cone be slidably and freely received in overlapping relationship within the bugle, it is possible to bolt the two members together so that an empty bin will not be subjected to movement during high winds and the like. In this respect, it will be noted that conduit 50 adds considerable support to the uppermost extremity of the storage bin, noting that conduit 51 is affixed to the superstructure while conduit 50 is affixed to an elevator (not shown).

The present invention provides an overhead storage bin which is cylindrical in design and highly resistant to corrosion. The storage bin is inexpensive to erect and is provided with a superstructure which enables a cylindrical bin to be supported from four spaced apart legs.

The tension members preferably are 3 inches wide, one-fourth inch thick, and effectively cooperate together to form a saddle for bottom supporting the cone. The apex of the cone is 12 inches in diameter with the base of the cone being 12 feet in diameter. By fabricating the novel storage bin from fiberglass built-up with resin, the cost of maintenance is greatly reduced, and furthermore, contamination of the contents of the bin is eliminated.

I claim:

1. An overhead storage bin comprised of a cylindrical body having a top in the form of a dome type closure means, and a bottom in the form of an inverted cone; means forming an inlet in said closure means; said cone having means forming an outlet at the apex thereof;
   a skirt member joining a marginal end portion of said cylindrical body to the base of said cone, said skirt being enclosed by a support band, said band having an outwardly directed circumferentially extending flange; superstructure means affixed to said flange for supporting said storage bin.

2. The storage bin of claim 1 wherein said band has a lower terminal edge portion, a plurality of radially spaced apart tension members, said tension members comprised of elongated metal members having one end affixed to said lower terminal edge portion of said band and another end which terminates in proximity of said outlet; and
   a circumferentially extending annular member affixed to the terminal end of said tension member.

3. The storage bin of claim 1 wherein said cylindrical body is comprised of two semicircular halves joined together along opposed edge portions thereof; said dome type enclosure means including a skirt member which joins the enclosure means to the cylindrical body.

4. The storage bin of claim 1 wherein said superstructure includes four spaced apart legs having the upper terminal ends thereof joined together by four horizontal members with the horizontal members being arranged in the configuration of a square; spaced apart diagonal braces affixed to adjacent horizontal members to provide eight contact areas against which the flange of the support band rests.

5. The storage bin of claim 1 wherein said outlet of said cone is received within a circumferentially extending bugle, a valve means affixed to one end of said bugle; a plurality of radially spaced apart tension members comprised of elongated members having one end affixed to an edge portion of said bugle and another end affixed to said support band.

* * * * *